UNITED STATES PATENT OFFICE.

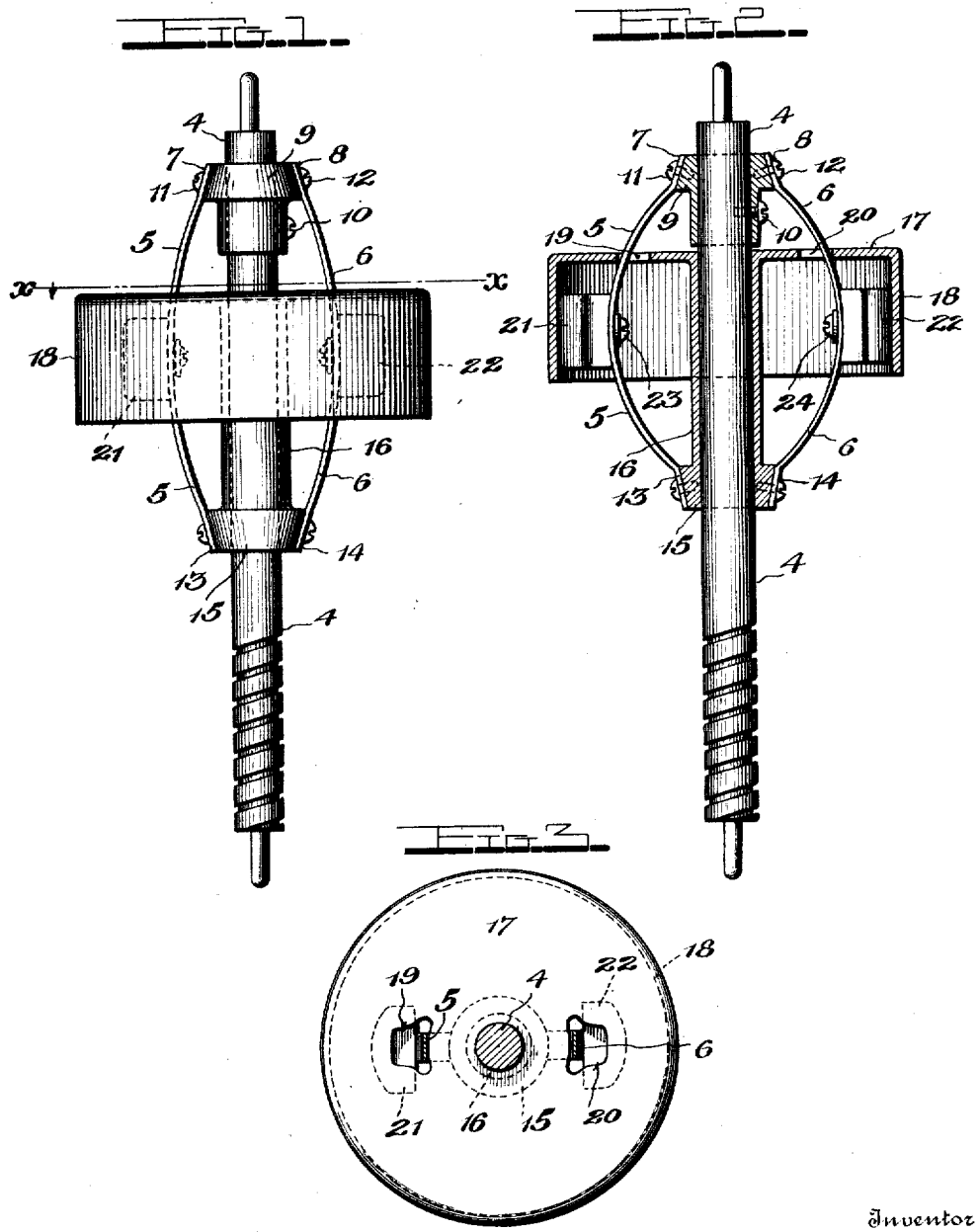

GEORGE T. CHERINGTON, OF WAUKEGAN, ILLINOIS.

SPRING-MOTOR GOVERNOR.

1,305,882.　　　　Specification of Letters Patent.　　Patented June 3, 1919.

Application filed June 17, 1916.　Serial No. 104,327.

*To all whom it may concern:*

Be it known that I, GEORGE T. CHERINGTON, a citizen of the United States, residing at Waukegan, in the county of Lake and State of Illinois, have invented a certain new and useful Improvement in Spring-Motor Governors, of which the following is a specification.

My invention relates to that class of devices which are designed for use in connection with either a piano or phonograph, although it will be apparent from the hereinafter contained description that it can be used with any spring motor.

Governors of this type, with which I am familiar, are subject to a number of objections. For example, the governor which usually consists of two flat springs having weights at their center when in action, the centrifugal effect exerted on the weights moves them outwardly and if the speed is excessive the weights will continue to move outwardly until they reach their limit of travel, after which, all of the centrifugal effect will be exerted upon the springs with the result that the springs are frequently broken.

Another objectionable feature is that in this type of construction, the weights and springs being unprotected set up vibrations, the pitch of whose tones will vary with the speed of the governor producing a very objectionable noise when used in connection with either a phonograph or a piano.

My invention has for its object to provide a device in which I provide for a predetermined travel or outward movement of the weights and a positive stop so that after the weights have attained this position, they will be mechanically supported and this mechanical structure will resist the centrifugal force, thus preventing any possibility of the springs being broken.

It will be apparent from the hereinafter contained descriptions that in attaining this object I also provide a construction which acts as a muffler and effectually prevents the objectionable noise usually produced by governors of this type.

My means of accomplishing the foregoing objects may be more readily understood by having reference to the accompanying drawings which are hereunto annexed and are a part of this specification, in which:

Figure 1 is a side elevation of my improvement in its normal position.

Fig. 2 is a view partly in section so as to show the interior construction.

Fig. 3 is a cross section taken on the line *x—x* in Fig. 1.

Similar reference numerals refer to similar parts throughout the entire description.

As shown in the drawing, the governor is mounted upon the revolving shaft 4, and consists essentially of two flat springs 5 and 6. The ends 7 and 8 of these springs are attached to a collar 9, which is fixed upon the shaft 4 by means of a set screw 10 or in any other suitable or convenient form for fastening. This sleeve 16 is connected to any of the usual suitable means (not shown) to apply a brake to the motor by the movement of the collar. Inasmuch as such mechanism forms no part of my invention, I have not illustrated it.

As shown, the springs are secured to the collar 9, by means of screws 11 and 12, although it is apparent that any suitable means for securing them may be employed. The other ends 13 and 14 of the springs 5 and 6 are mounted upon the end 15 of a sleeve 16, which is mounted and slidable upon the shaft 4. The inner end of this sleeve 16 is provided with a disk 17, which has a laterally extended peripheral flange 18. Openings 19, and 20, are provided for the passage of the springs 5 and 6 through the disk 17. Secured to the center of the springs 5 and 6 are weights 21 and 22, which are fastened by means of screws 23 and 24, although any desired form of fastening may be employed. The outer surface of these weights 21 and 22 are turned on the same radius as the inner wall of the peripheral flange 18.

The operation of the device is as follows: When the shaft 4 is revolved at an excessive rate of speed, the centrifugal effect will cause the springs 5 and 6 to move outwardly through the medium of the weights 21 and 22, and if the speed continues to be excessive, the outer surface of the weights will be brought in contact with the inner surface of the peripheral flange 18, when any further outer movement is prevented, and it is obvious that all further centrifugal effect is resisted by the disk 17, and the peripheral flange 18, thus effectually preventing the breaking of the springs, while the location of the weights within the peripheral flange has the result of effectually muffling the noise caused by a governor of this type in a device of this character.

Although I have described a specific form for utilizing my invention, I desire to be understood as not limiting myself to any specific form of mechanism except as such limitations shall appear in the hereinafter contained claims.

Having described my invention what I regard as new and desire to secure by Letters Patent is:

1. A governor having a muffler, comprising the combination with a revolving shaft, of a disk slidably mounted on said shaft, a peripheral flange on said disk, there being two slots in said disk, a collar fixedly mounted on said shaft secured to said disk and slidable on said shaft, two flat springs connecting the end of said sleeve with the said collar, a weight secured to the central portion of each of said springs, the outer surface of said weights being adapted to fit the internal wall of the peripheral flange.

2. A device of the character described comprising the combination with a shaft, of a cylindrical sleeve splined on said shaft, one end of which terminates in a disk, a peripheral flange on said disk, a collar fixedly mounted on said shaft beyond said disk, a plurality of springs secured to one end of said sleeve and said collar, a weight secured to each of said springs, said springs extending through openings formed in the said disk, the said openings being of such shape as to permit the weights to contact with the flange on the disk.

3. A device of the character described comprising the combination with a motor, of a disk secured to a revolving shaft, a laterally extending peripheral flange on said disk, a laterally extending sleeve slidably mounted on said shaft and connected to said disk, a collar fixedly mounted upon said shaft, two flat springs secured to said collar and the end of the slidable sleeve, there being openings through said disk through which said springs pass, a weight secured to the central portion of each of said collars, the outer surface of the said weights being adapted to fit and coinciding with the internal wall of the peripheral flange.

4. In a device of the character described, the combination with a revolving shaft, of a collar fixedly mounted on said shaft, a sleeve slidably mounted on said shaft but rotating therewith, a disk secured to one end of said sleeve, a laterally extending peripheral flange on said disk, means to connect the collar with the end of the sleeve, weights secured to said means, said means tending normally to hold the said weights out of engagement with said peripheral flange, said weights being adapted to contact with the inner wall of the peripheral flange when the shaft revolves above a predetermined rate of speed.

5. In a device of the class described, the combination of a rotatable shaft, a plurality of flexible strips mounted on said shaft and substantially parallel thereto, weights on said strips intermediate the ends thereof, and a bell-shaped member mounted on said shaft to rotate therewith and having openings therein through which said flexible strips extend.

6. In a device of the class described, the combination of ball governors comprising balls and means to flexibly connect the balls to the governor shaft and a bell-shaped member to limit the movement outward from the shaft of the weights, said member being provided with openings through which said connecting means extend.

In testimony whereof I have hereunto signed the foregoing specification.

GEORGE T. CHERINGTON.